United States Patent [19]

Bazen

[11] 4,401,150

[45] Aug. 30, 1983

[54] POLYMER COOLING CAN

[75] Inventor: Badger R. Bazen, Johnsonville, S.C.

[73] Assignee: Badger R. Bazen Co., Inc., Johnsonville, S.C.

[21] Appl. No.: 190,628

[22] Filed: Sep. 25, 1980

[51] Int. Cl.³ .......................... F24H 3/00; F25D 3/08
[52] U.S. Cl. ........................................ 165/47; 62/371; 62/457
[58] Field of Search .................. 220/23.6; 62/371, 457; 126/343.5 A; 165/47

[56] References Cited

U.S. PATENT DOCUMENTS

| | | | |
|---|---|---|---|
| 1,407,614 | 2/1922 | Wicks | 249/129 |
| 1,854,169 | 4/1932 | Fryhofer | 62/457 |
| 2,821,327 | 1/1958 | Glazer | 220/23.6 |
| 2,896,809 | 7/1959 | Metzger et al. | 220/23.6 |
| 3,805,543 | 4/1974 | Eriksen | 62/371 |

Primary Examiner—Albert W. Davis
Assistant Examiner—Margaret A. Focarino
Attorney, Agent, or Firm—Cushman, Darby & Cushman

[57] ABSTRACT

An apparatus for containing cooling polymer melts and remelted scrap having a large cross-sectional surface area with an interiorly located cooling channel or channels extending from one sidewall to the other for circulating cooling media. Additional novel arrangements include intersecting cooling channels.

12 Claims, 3 Drawing Figures

POLYMER COOLING CAN

BACKGROUND OF THE INVENTION

This invention relates generally to the heat transfer field and more specifically to a means for uniformly cooling thermo-plastic polymers across a large cross-sectional area to prevent thermal degradation.

While the invention may be advantageously utilized to reduce thermal degradation and waste losses, the invention finds particular utility in the reduction of waste from reliquified polycondensation polymers.

In conventional recycling and retrieval, reliquified polymer scrap and the like is poured into large cooling and storage containers. Since only the outer portions of these containers are exposed to air currents and other cooling media, non-uniform cooling occurs resulting in thermal degradation of substantial amounts of the cooling polymer liquid since the outer skin of the cooling polymer in the container forms an insulation barrier blocking further core cooling. Maintaining the core at elevated temperatures for too long results in thermal degradation with the production of large amounts of commercially useless polymer waste.

This low thermal stability of some thermoplastic polymers may be attributed to the presence of reactive groups and chain units, e.g., —OH, —Cl, RCO—, which may be eliminated from the molecule in the form of water, hydrogen chloride, alcohol and ammonia. Thermal degradation may well be promoted by the presence of excess acidic groups or constituents, e.g. excess dicarboxycylic acid in polycondensation products. Other undesired results include the production of the noxious or toxic gases.

Although means for cooling polymer products or reliquified polymer scraps are known, the present invention represents a substantial improvement over the conventional apparatus by avoiding thermal degradation by providing more uniform cooling of the liquid polymer while also providing a large volume container that is easy to handle, transport and store.

SUMMARY OF THE INVENTION

The invention may be briefly summarized as including within its purview an improved system of cooling thermoplastic polymer products or reliquified polymer products comprising a container with a plurality of interiorly located cooling channels disposed across the diameter of the can so that the interior portions of the contents of the container may be cooled at a suitable rate by contacting air currents or other circulating cooling media. In use, polymer material delivered by an extruder or like device where a change-over in the device is taking place is delivered to one or more cans of the present invention from the extruder outlet. The collected polymer is then stored where uniform cooling is effected to an extent that avoids degradation of the polymer in the interior portions of the can. The cooled and solidified polymer may then be reworked at a later date.

Included among the objects of the present invention is the reduction of useless polymer waste resulting from thermal degradation by using the improved cooling can of simple design and manufacture.

Many other features and advantages of the present invention will become manifest to those versed in the art upon making reference to the detailed description which follows and the accompanying drawings, in which a preferred structural embodiment is shown incorporating the principles of the present invention by way of illustration only.

DETAILED DESCRIPTION OF THE DRAWINGS

Figure 1:
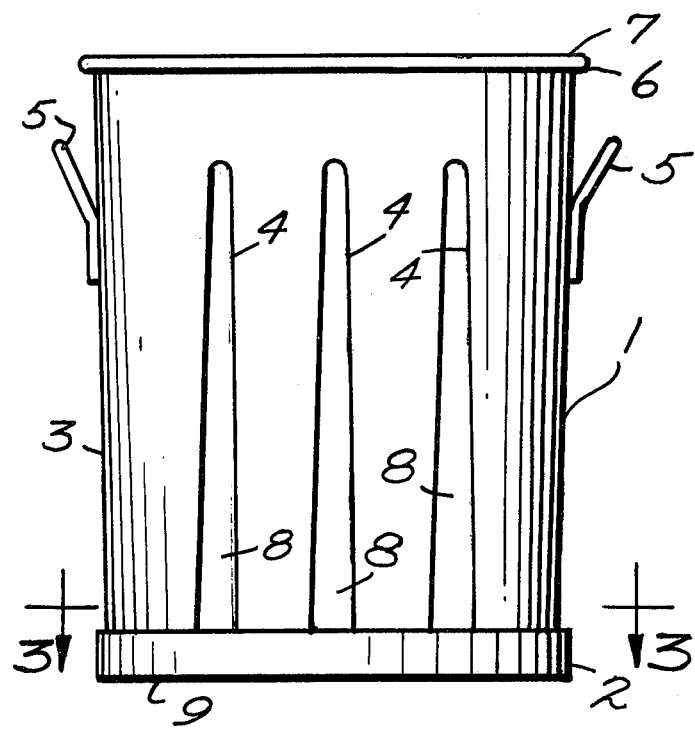
FIG. 1 is a side view of a cooling container constructed in accordance with the principles of the present invention.

The present invention relates to cooling cans for thermoplastic polymer products and scrap remelts. FIG. 1 shows cooling container 1 with a large cross-sectional area both interiorly and exteriorly thereby promoting more uniform cooling to avoid thermal degradation. Container 1 is defined by bottom support band 2, sidewall 3, cooling channels 4, handles 5 and lip 6 at the rim 7 of container 1. Container 1 may be cylindrically shaped with a slight taper with a top diameter larger than the bottom diameter.

Cooling channels 4 extend across the interior of can 1 with each cooling channel 4 extending between sidewall openings 8 and their corresponding respective openings on the opposite sides of sidewall 3. Consequently the circulating cooling media may enter a sidewall opening 8, flow unimpeded through the respective cooling channel 4 to cool the interior portions of container 1, and may exit from the opening at the opposite side.

Cooling channels 4 are spaced interiorly away from sidewall 3 and from each other and are roughly parallel to each other. Thus the channels 4 are placed to partially divide the interior of container 1 into equal sectional volumes.

Each cooling channel 4 has an open bottom extending across its entire length. This allows cooling media to flow upwardly from the bottom into cooling chananels 4 to further promote the effective interior cooling of container 1. Extending upwardly from the bottom, cooling channels 4 taper inwardly to meet and form a sealed ridge located below lip 6. Thus all interior surfaces between the bottom and lip of the container 1 are tapered to greatly facilitate removal of the solidified polymer from the can.

Bottom support band 2 wraps around the lower portion of side wall 3 where the open channels bottoms meet sidewall 3 and extends downwardly a distance to form support rim 9.

Handles 5, attached to sidewall 3, allow simple and easy transportation of container 1.

In use, polymer fragments or polymer products that are heated to a liquid state are poured into container 1 where uniform core cooling is provided by circulating air currents or liquid coolant medium passing through cooling channels 4. This avoids thermal degradation of the polymer in the interior portion of container 1.

Figure 2:
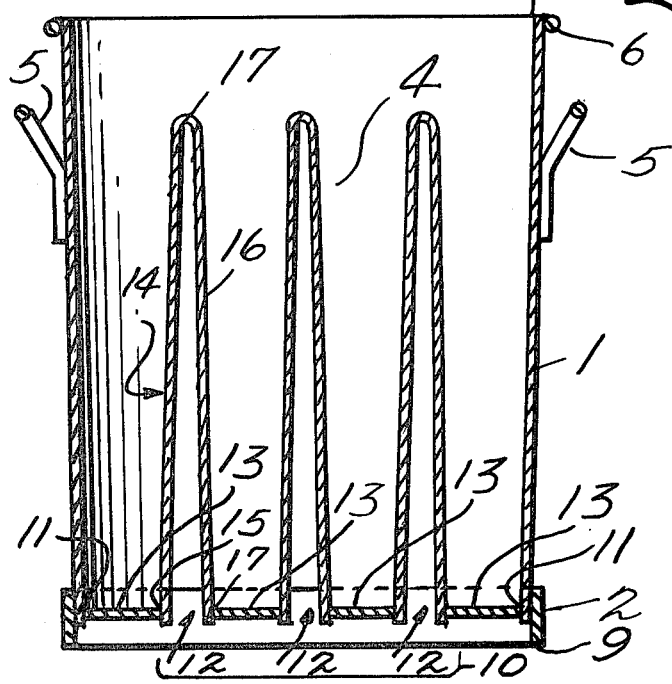
FIG. 2 is a sectional view across the front diameter of a cooling container constructed in accordance with the principles of the present invention.

FIG. 2 shows in cross-section cut-away with more detail the cooling container of the present invention.

Container bottom wall 10 attaches to side wall 3 at edges 11. Each cooling channel 4 intersects and joins bottom wall 10 at channel bottom openings 12 thereby dividing bottom wall 10 into sections 13. Channel wall member 14, being first joined to bottom wall section 13 at edge 15, extends towards the open end of container 1 defined by rim 7 and joins with channel wall member 16 at the apex 17 of cooling channel 4 located in the interior of container 1. Channel wall member 16 then returns back towards and joins the adjacent bottom wall section 13 at the opposite edge 17 of bottom opening 12.

The distance "D" across bottom sections 13 determines the separation between cooling channels 4. Preferably the cooling channels 4 are spaced to provide approximately equal cross-sectional cooling areas for sectional volumes shown in cut-away. In a preferred embodiment the distance "D" between the wall 16 and 14 of adjacent channels is approximately 3" at the base. Tests have shown that a dimension between 2.5-4" gives good results.

The cooling channels 4 defined by channel walls 14 and 16, bottom openings 12, and apexes 17, while shown only in cross-section in FIG. 2, extend across the interior of container 1 between opposite and associated sidewall openings 8.

Lip 6 and handles 5 may be constructed from metal rod stock and container 1 may be constructed from suitable sheet metal stock such as aluminum. Preferably all component parts are welded, the continuous fillet type, together in the present invention.

Figure 3:
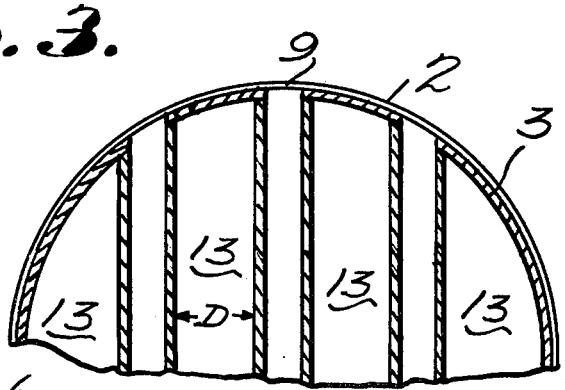
FIG. 3 is a partial sectional view across the bottom of a cooling container constructed in accordance with the principles of the present invention.

FIG. 3, in a partial and sectional bottom view of container 1, shows cooling channels 4, bottom wall sections 13, sidewall 3 and the bottom support band 2 forming standing rim 9. As can be seen from FIG. 3, circulating air or other coolant medium may freely flow both from underneath and through a sidewall opening 8 across the cross-sectional diameter of the container of the present invention where the container rests on a perforated platform such as a grate. This facilitates the cooling and promotes the more uniform cooling of the polymer located on the interior portions of container 1.

The invention has been herein shown and described only in what is presently conceived to be the most preferred and practical embodiment. Many modifications can be made. For example, the container may only have one cooling channel, a pair of intersecting cooling channels, or several cooling channels criss-crossing and intersecting with one another. Moreover, the container may have several shapes. Therefore, since it will be apparent to those of ordinary skill in the art that these and many other modifications may be made thereof within the scope of the invention, such scope is to be accorded the broadest interpretation of the appended claims as to encompass all equivalent apparatus.

What is claimed is:

1. A container for cooling thermoplastic material, said container having side wall means, bottom wall means, a rim defining the open end of said container, and cooling channel means disposed on the interior thereof and extending across the interior of said container from one side to the other thereby forming a passageway for circulating cooling medium to assist in cooling the contents of said container inwardly of said side wall means, said channel means comprising (a) an elongated opening in said bottom wall means extending across from one side of said container to the other side of said container; (b) heat transfer surface means commencing at one end of said opening, extending away from said bottom wall means into the interior of said container, returning back toward said bottom wall means and meeting the opposite edge of said opening without discontinuity; and (c) apertures in said side wall means corresponding to an area defined by the intersection of said heat transfer surface means with said side wall means.

2. A container as recited in claim 1 further comprising a plurality of said cooling channel means spaced apart from each other on the interior of said container.

3. A container for cooling thermoplastic material, said container comprising side wall means, bottom wall means, a rim defining the open end of said container, cooling channel means disposed on the interior portion of said container and extending across said container from one side to the other thereby forming a passageway for circulating cooling medium to assist in cooling the contents of said container located inwardly of said wall means, said cooling channel means being defined by:

(a) an elongated opening in said bottom wall means extending across from one side of said container to the other side of said container;
(b) heat transfer surface means being joined at one edge of said elongated opening, extending away from said bottom wall means into the interior of said container, forming an apex, returning back towards said bottom wall means and being joined to the opposite edge of said elongated opening without discontinuity;
(c) said heat transfer surface means tapering from said opposite edges of said openings towards said apex; and
(d) apertures in said side wall means corresponding to an area defined by the intersection of said heat transfer surface means with said side wall means.

4. A container as recited in claim 3 wherein said sidewall means taper from said rim towards said bottom wall means.

5. A container as recited in claim 4 wherein said side wall means further comprises handle means.

6. A container as recited in claim 5 further comprising sidewall support means being defined by a metal rim wrapping about said container where said elongated openings and said side wall means meet.

7. A container as recited in claim 3 wherein said heat transfer surface means extends substantially perpendicularly from said elongated opening in said bottom wall means towards said apex.

8. A container as recited in claims 3, 4, 5, 6 or 7 further comprising a plurality of said cooling channel means being spaced apart from each other on the interior of said container.

9. A container for uniformly cooling heated thermoplastic material comprising:

a bottom wall;
side wall means extending from said bottom wall to a rim and being joined to said bottom wall to define the interior of said container;
said bottom wall having a plurality of openings formed therein each extending from and including one side of said interior of said container to and including a respective opposite side thereof, said side wall means having a corresponding plurality of pairs of side wall openings formed therein with a side wall opening of each pair extending from an associated opening in said bottom wall at one end thereof toward said rim;

a plurality of interior channel wall members each associated with one of said openings in said bottom wall, each of said openings in said bottom wall having opposite edges, each said channel wall member having a first portion connected to one of said edges along the entire length of said edge from one side of said interior of said container to the other side, a second portion extending from said first portion toward an apex, a third portion extending from said apex toward a fourth portion adjacent said opposite edge of said opening in said bottom wall, and said fourth portion being connected to said opposite edge along the entire length of said opposite edge from one side of said interior of said container to the other side thereof, each of said channel wall members having opposite side edges extending from said first portion to said fourth portion thereof respectively without discontinuity, each of said side edges of each of said channel wall members being secured to said side wall means along the periphery of an associated respective side wall opening.

10. A container as recited in claim 9 wherein said channel wall members taper from each pair of said edges of the associated said opening towards said apex interiorly located in said container.

11. A container as recited in claim 10 wherein said side walls taper from said rim to said bottom wall.

12. A container as recited in claims 9, 10, or 11 wherein said openings in said bottom wall are spaced from 2.5 to 4.0 inches apart and said channel wall members extend substantially perpendicularly from a said respective opening in said bottom wall.

* * * * *